United States Patent
Macallum et al.

(10) Patent No.: US 11,822,701 B2
(45) Date of Patent: Nov. 21, 2023

(54) SECURING AND MANAGING OFFLINE DIGITAL EVIDENCE WITH A SMART DATA LEASE SYSTEM

(71) Applicant: VIQ Solutions Inc., Mississauga (CA)

(72) Inventors: Malcolm Macallum, Rockwood (CA); Gilles-Andre Morin, Newton, MA (US)

(73) Assignee: VIQ Solutions Inc., Mississauga (CA)

( * ) Notice: Subject to any disclaimer, the term of this patent is extended or adjusted under 35 U.S.C. 154(b) by 218 days.

(21) Appl. No.: 17/226,241

(22) Filed: Apr. 9, 2021

(65) Prior Publication Data

US 2022/0327239 A1     Oct. 13, 2022

(51) Int. Cl.
| | | |
|---|---|---|
| *G06F 21/64* | (2013.01) | |
| *G06Q 50/18* | (2012.01) | |
| *G06F 21/62* | (2013.01) | |
| *G06F 21/60* | (2013.01) | |

(Continued)

(52) U.S. Cl.
CPC .......... *G06F 21/64* (2013.01); *G06F 21/6209* (2013.01); *G06Q 50/18* (2013.01); *G06F 16/2358* (2019.01); *G06F 21/55* (2013.01); *G06F 21/604* (2013.01); *G06F 21/6218* (2013.01); *G06F 2221/2143* (2013.01)

(58) Field of Classification Search
CPC .... G06F 21/64; G06F 21/6209; G06F 21/604; G06F 21/6218; G06F 21/62; G06F 21/55; G06F 21/60; G06F 2221/2143; G06F 16/2358; G06Q 50/18; G06Q 50/26
USPC ......................................................... 713/168
See application file for complete search history.

(56) References Cited

U.S. PATENT DOCUMENTS

| | | | | |
|---|---|---|---|---|
| 7,721,088 B2* | 5/2010 | Okamoto | ................ | H04L 9/002 380/255 |
| 9,210,146 B2* | 12/2015 | Shimshoni | .............. | H04L 63/08 |
| 11,271,718 B2* | 3/2022 | Bessonov | ............. | H04L 9/0637 |

(Continued)

FOREIGN PATENT DOCUMENTS

| | | | | | |
|---|---|---|---|---|---|
| CN | 100527141 C | * | 8/2009 | ............. | G06F 21/10 |
| CN | 1842086 B | * | 10/2010 | ............. | G06F 21/10 |

(Continued)

OTHER PUBLICATIONS

KR_20210021526_A_Record Evidence of Communication in Human-Machine Interactions (Machine Translation) by Nahamoo David, Jablokov Igor and Pickover Clifford A pp. 10; Date Published: Feb. 26, 2021.*

(Continued)

*Primary Examiner* — Shahriar Zarrineh
*Assistant Examiner* — Ali H. Cheema
(74) *Attorney, Agent, or Firm* — Jeffri A. Kaminski; Venable LLP (57) ABSTRACT

The system is used by both Producer and Consumer of digital evidence, which use the system to provide a secure and irrefutable record of a transaction involving the use of the digital evidence to produce new protected digital evidentiary content, e.g. transcription, according to a set of rules and limitations on the use of the digital evidence over a specific period of time which expires after a certain time. The newly create evidentiary content along with security and metadata are evaluated, and results used to confirm that the evidence has been maintained according to the terms and conditions.

14 Claims, 5 Drawing Sheets

(51) Int. Cl.
*G06F 16/23* (2019.01)
*G06F 21/55* (2013.01)

(56) References Cited

U.S. PATENT DOCUMENTS

| | | | | |
|---|---|---|---|---|
| 2003/0225701 | A1* | 12/2003 | Lee | G06F 21/10 705/57 |
| 2007/0230698 | A1* | 10/2007 | Shamoon | H04N 21/631 380/232 |
| 2007/0260457 | A1* | 11/2007 | Bennett | G11B 27/10 704/E15.005 |
| 2008/0215437 | A1* | 9/2008 | Levy | G06Q 30/02 705/14.54 |
| 2011/0107408 | A1* | 5/2011 | Blot-Lefevre | H04L 9/321 726/7 |
| 2011/0119504 | A1* | 5/2011 | Nishimura | H04N 21/4623 713/193 |
| 2011/0289594 | A1* | 11/2011 | Shibata | G06F 21/00 726/26 |
| 2013/0019322 | A1* | 1/2013 | Nishimura | G06F 21/10 726/29 |
| 2013/0055414 | A1* | 2/2013 | Shibata | G06F 21/10 726/30 |
| 2013/0254133 | A1* | 9/2013 | Connell | G06Q 10/10 705/342 |
| 2013/0283401 | A1* | 10/2013 | Pabla | G06F 21/554 726/30 |
| 2016/0261676 | A1* | 9/2016 | Nishimoto | H04L 67/06 |
| 2018/0055435 | A1* | 3/2018 | Macallum | G09B 5/02 |
| 2018/0176017 | A1* | 6/2018 | Rodriguez | H04L 63/20 |
| 2019/0173854 | A1* | 6/2019 | Beck | H04L 63/123 |
| 2020/0104953 | A1* | 4/2020 | Burns | G06F 16/685 |
| 2020/0159891 | A1* | 5/2020 | Patel | G06F 21/16 |
| 2020/0184556 | A1* | 6/2020 | Cella | G06Q 30/0278 |
| 2020/0258176 | A1* | 8/2020 | Gibson | G06F 21/32 |
| 2020/0272619 | A1* | 8/2020 | Alferov | H04L 9/0643 |
| 2020/0358912 | A1* | 11/2020 | Yamada | H04N 1/00148 |
| 2020/0410616 | A1* | 12/2020 | Theunis | G06Q 20/1235 |
| 2021/0286891 | A1* | 9/2021 | Sislow | G06F 16/2379 |
| 2021/0398075 | A1* | 12/2021 | Hoeppler | G06Q 20/145 |
| 2022/0210061 | A1* | 6/2022 | Simu | H04L 9/3239 |
| 2022/0237565 | A1* | 7/2022 | Dzierzanowski | G06Q 10/103 |
| 2022/0318918 | A1* | 10/2022 | Joao | G06Q 40/08 |
| 2022/0366022 | A1* | 11/2022 | Goldston | G06F 21/33 |

FOREIGN PATENT DOCUMENTS

| | | | | |
|---|---|---|---|---|
| CN | 104361291 | A * | 2/2015 | G06F 21/6218 |
| CN | 105608188 | A * | 5/2016 | |
| CN | 107682308 | A * | 2/2018 | G06F 21/602 |
| CN | 107888865 | A * | 4/2018 | |
| CN | 110024422 | A * | 7/2019 | G06F 16/1824 |
| CN | 111327597 | A * | 6/2020 | H04L 63/06 |
| CN | 111787361 | A * | 10/2020 | H04N 21/2347 |
| CN | 111930838 | A * | 11/2020 | G06F 16/27 |
| CN | 112559975 | A * | 3/2021 | G06F 21/10 |
| CN | 114691669 | A * | 7/2022 | |
| GB | 2534374 | A * | 7/2016 | G06F 16/256 |
| JP | H11213553 | A * | 8/1999 | |
| JP | 3880412 | B2 * | 2/2007 | |
| JP | 2011528207 | A * | 11/2011 | |
| KR | 20080026610 | A * | 3/2008 | G11B 27/10 |
| KR | 100886690 | B1 * | 3/2009 | H04L 9/0825 |
| KR | 20110096167 | A * | 8/2011 | G06Q 30/02 |
| KR | 20210021526 | A * | 2/2021 | G06F 16/27 |
| WO | WO-2006054662 | A1 * | 5/2006 | H04L 67/28 |
| WO | WO-2016108262 | A1 * | 7/2016 | G06F 13/00 |
| WO | WO-2019233951 | A1 * | 12/2019 | G06F 21/10 |

OTHER PUBLICATIONS

A Forensic Investigation for Suspects' digital evidences using Image Categorization* by Youngsoo Kim, Dowon Hong, and Dongho Won pp. 4; IEEE (Year: 2008).*

International Search Report and Written Opinion in corresponding International Application No. PCT/US22/23717 dated Aug. 9, 2022 (9 pages).

* cited by examiner

SECURING AND MANAGING OFFLINE DIGITAL EVIDENCE WITH A SMART DATA LEASE SYSTEM

TECHNICAL FIELD

The present disclosure relates to securely managing digital evidence, and in particular to the secure processing of audio/visual recording into document transcripts when exchanging secure evidence between offline and online environments in the field of voice to document processing.

BACKGROUND

Digital evidence comes in many forms including audio, video, images, documents, and other media. Typically, the digital evidence or digital content needs to be moved in and then back out of secure content management platforms for processing. The initial processing may include uploading the digital content to a secure site from external fixed devices or a capture of events that occurred. For security, the digital content requires an audit trail, chain-of-custody, and/or a transcription to provide documented proof of the event depicted thereon. Often the devices capturing or processing the event are privately owned or owned by a third party. Today to retrieve that digital content requires numerous, laborious, and time-consuming processes to secure it legally. Simultaneously the chain-of-evidence must also be protected and documented so that when this digital content is used for evidentiary purposes it retains veracity. One of the unsolved problems associated with identifying, collecting, and processing all digital evidence related to an event is securing that digital evidence when it is authorized to be used offline as would be the case in producing a transcript from original and protected digital audio evidence or testimony. Providing authorized access to the digital content and maintaining auditable management of that content is difficult at best. Since this is a bi-directional process, those that create new digital content and those that must access the digital content for various authorized purposes may be classed into two types: the Producer who creates new digital evidence, and the Consumer who uses that digital evidence for an authorized purpose and under a specific set of limitations. Another complicating factor is that the Producer may be working on behalf of an original owner, e.g. who could be a customer of the Producer. The same problem applies to offline digital content that needs to be moved into a secure online evidence environment or case records.

SUMMARY

Accordingly, a first apparatus includes a Smart Data Lease application for Securing Offline Content which would run within a Evidence Management Cloud or Data Centre. The application forms the central core of the process for managing the movement and tracking of evidentiary content from inside a secure online environment to an offline environment and back.

Accordingly a method for providing secure access to digital content in accordance with an exemplary system comprises:

storing, by a first processor, original digital evidence in a first block of a blockchain database, providing a secure record thereof;

storing, by the first processor, first terms and conditions for a first consumer to access a first copy of the original digital evidence;

providing the first terms and conditions to the first consumer for a first digital acceptance thereof, prior to the first copy of the original digital evidence being accessible;

upon the first digital acceptance, generating, by the first processor, a first temporary secure data cache including the first copy of the original digital evidence and the first terms and conditions accessible by the first consumer;

generating first audit details relating to interactions between the first consumer and the first copy of the original digital evidence related to maintaining veracity of the first copy of the original digital evidence; and deleting, by the first processor, the first data cache including the first copy of the original digital evidence, after a first predetermined time period, in accordance with the first terms and conditions.

In another example a computing apparatus for providing secure access to digital content comprises:

a first processor; and a first non-transitory memory storing instructions that, when executed by the processor, configure the computing apparatus to:

store original digital evidence in a first block of a blockchain database providing a secure record thereof;

store first terms and conditions for a first consumer to access a first copy of the original digital evidence;

provide the first terms and conditions to the first consumer for digital acceptance thereof, prior to the first copy of the original digital evidence being accessible;

upon the digital acceptance, generate a first data cache including: the first copy of the digital evidence accessible by the first consumer, and the first the terms and conditions;

generate first audit details relating to interactions between the first consumer and the first copy of the digital evidence related to maintaining veracity of the first copy of the digital evidence; and delete the first data cache including the first copy of the digital evidence, after a predetermined time period, in accordance with the first terms and conditions.

In any of the above examples, the first apparatus may also include that a process for the exchange of digital signatures, a mechanism for writing proprietary Blocks to a specialized Blockchain and algorithms for the analyses and verification of the certain conditions for evidence release to authorized personnel. The apparatus cover the transition of evidence between content Producers' securely managed online environments, whether Cloud or Data Centre based and offline environments where destination content Consumers such as Transcribers use unknown computers with intermittent Internet connections to process evidence according to job descriptions contained in the Terms and Conditions outlined by the content Producer.

Accordingly, a second apparatus includes a Smart Data Lease program for the Consumers/Transcribers offline computing system to affect the completion of the Producer requested job. This application work with the evidence components and applets unpacked from the provided Block(s). This provides a secure local environment and the proprietary tools needed to work with the provided content but prevent there use by off-the-shelf applications which perform similar functions such as AV players.

In any of the above embodiments, the second apparatus may also include that components for reading and writing Blocks as well as proprietary working tools such as players and applets to examine local environment identifiers such as MAC number, IP addresses, ESN number or similar. Also these apparatus would include algorithms for producing a compressed audit trail tracking local environment events, errors, times, users, functions executed and so forth.

BRIEF DESCRIPTION OF THE DRAWINGS

Some example embodiments will be described in greater detail with reference to the accompanying drawings, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Several professions, such as Justice, Insurance, Medical, Education and Police, investigate certain events that occur, and therefore need to find and/or record all the evidence related to each event, which typically exists across a multitude of devices and formats. Once that evidence has been identified the task of legally procuring or providing a copy begins, which may involve paperwork, judicial processes, documentation, setting up an agreement with owner, and obtaining the digital evidence. The reverse is also true when required to move evidentiary content outside of a secure environment. Moving digital content for evidentiary purposes whether into a secure and managed environment or moving out of a secure and managed environment presents similar issues. A problem inherent in the process of that procurement is that the Producer loses control over and/or confidence in the veracity of the content. Moreover many markets are also concerned with liability and privacy resulting from pre-emptive public release across various social or other types of media platforms.

In accordance with the present embodiment, the automatic generation of procurement, documentation, and chain-of-custody all while protecting the Producer's rights, may be achieved with some innovative use of a secure database, such as blockchain technology, extended with unique and important customizations. Secure databases, such as Blockchain, provide an immutable and secure method for permanently documenting transactions as they occur which may then certified my multiple parties. If the Blockchain's capabilities are extended with a set of rules or terms, then control under which circumstances the exchange of digital data takes place may be provided and communicated. Taken a step further the terms could represent an agreement or contract between the Producer, in this case the digital content owner, and the Consumer, the person or organization wishing to have access to that content for various legitimate reasons. Unlike digital rights or copyright, the material owned by the Producer is not sold, but rather access to the content is provided to predetermined secure users for a limited time frame and for a limited purpose. Conversely the Consumer is obliged to prevent the content from being provided to any other party or parties. The present invention provides a secure environment within which a secure and traceable exchange may take place which has an expiry date and limitations associated with the exchange. A transaction may occur which provides an immutable record of the exchange. In addition, each party has a fully vetted communication stream as the exchange progresses through the timeframe.

What is key to the exchange is that the Producer and the Consumer may not know each other and yet they need to have a "managed" and secured exchange take place that is authenticated by others for a chain-of-custody purposes.

The present disclosure aims to secure and streamline that process by providing a secure and immutable chain-of-custody for digital evidence. Moving digital content to or from a third-party environment is an important component of processing digital evidence, whether to secure that evidence or to permit additional processing of it to produce new content, such as a transcription. Moving digital evidence outside or into a secure repository needs to be performed with as much confidence as that evidence has when secured inside a digital management repository. In effect the present embodiment establishes a smart digital data lease design that manages and tracks the exchange of secure content to offline environments and any new content exchanged back.

When digital audio and/or video is captured as part of the evidence or testimony it is likely that it will be used to produce a verbatim transcript. Under the best circumstances this is done within a secure environment either online or within a secure network or secure Cloud. As the price of transcriptions is reduced, the cost of working within an online environment rises, and in the absence of locations where online environments available, a system for providing digital evidence for processing in an offline environment is required. This presents several problems the most critical being security of that evidence. In parallel, confidentiality needs to be assured and control of that content in terms of distribution, sharing or coping needs to be closely controlled even if offline. In addition, it is likely that new digital content may be produced, which may need to be exchanged back into an online secure environment. The solution provides for a mechanism to enable this online/offline exchange of content to be managed with the same level of control as if solely online.

To control that offline content with the same degree of assurance five aspects may need to be addressed: 1) Managing the authorized users use of that evidence; 2) Controlling what conditions are associated with that use; 3) Preventing unauthorized use to the extent possible; 4) Tracking and reporting the disposition of that evidence; and 5) Securely returning new content to Evidence.

Digital evidence or content may be captured in many formats and for many purposes. One example is the insurance market, which captures evidence or testimony as it relates to an insurance claim or an insurance claims process. Usually, the evidence would be a digital audio file, which in many cases will end up as a transcript supporting a liability position for a particular claim. Typically, a transcriber will listen to the audio record, and type the information verbatim and against a particular turnaround time using provided tools and online SaaS solutions. However, current transcribers require a lower cost solution to maintain a competitive edge. Some of those costs evolve around online costs, bandwidth usage, subscription fees and so on. With the innovation according to the present disclosure, the transcribers, when authorized, may take that evidentiary content offline and process it offline in a manner that enables the Producer to provide that access under certain terms and conditions. These terms and conditions might include parameters, such as file name, a digital signature, an amount of time during which they have certain types of access, e.g. read or play, restrictions on what they do with that file and automatic removal of all evidence when the expiry terms are reached. Part of the expiry process is the return to the source (Producer) of new content, e.g. in this case transcripts, to the origin. In this process, one of the Consumers may be creating new content.

The movement of evidence outside of or into a secure environment requires special precautions to be taken to protect that content for confidentiality, privacy, security, or other owner dictated terms. These precautions must be robust enough to ensure that the owner's security needs and continuity needs are assured. In addition, because legal evidence is being dealt with, that content must not be allowed to be otherwise compromised, distributed, or corrupted in anyway not authorized by the owner. The solution to this is to provide a proprietary mechanism for packaging, accessing, reading, and manipulating this content for a specified purpose and specified period of time and then returning newly created content while leaving no trace of the original content in the offline environment.

Figure 1:
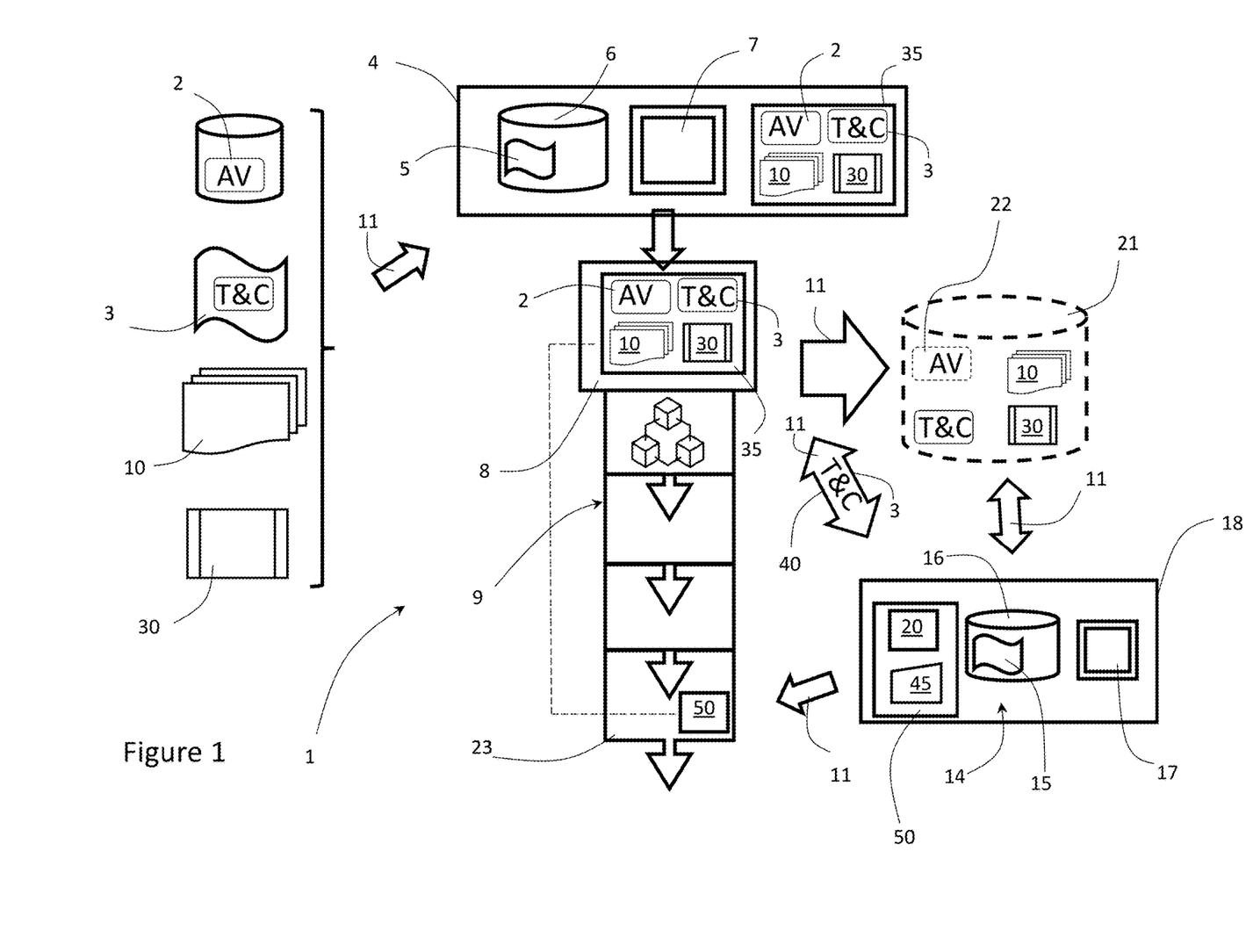
FIG. 1 is a schematic detail diagram in accordance with an example embodiment of the present disclosure.

With reference to FIG. 1, the diagram illustrates the flow of information back and forth between an evidentiary content management company (Producer), e.g. owner of system, a Client, and a Consumer, e.g. a transcriber. An exemplary process 1 may start with a request 10 to prepare a transcript of an audio recording using an offline environment. The request 10 may be provided to the Producer by a Client, and the request 10 may require a response comprising two primary components: the authenticated audio/video evidence 2 and the terms and conditions 3 that the Producer is prepared to provide a data lease under. The terms and conditions 3 may be encoded into an encrypted digital package as part of the Producer's data lease application. The present example process 1 involves a claim or a case in which some liability is being accessed to determine legal obligations. The Producers' Client, e.g. insurance company or police department, has identified that digital evidence 2 exists, and with the Producer assembles an agreement with rules, e.g. terms and conditions 3, for exchanging access to that digital evidence 2. The Producer assembles the digital evidence 2, which may include one or more of data files, audio files, pictures, video files, metadata, applets for tracking, and audit data, etc. from whatever devices the digital evidence 2 originated, either directly or over a suitable network, and agrees upon the terms and conditions 3 of the storage and access of the digital evidence 2 with the Client.

Using a data lease system 4, which may comprise computer software instructions 5 stored on non-transitory memory 6 that are executable by a processor 7, the digital evidence 2, preferably along with the agreement 10, the terms and conditions 3 and other metadata used to track both source and destination criteria, may be encoded into one or more blocks 8 in a database on a Blockchain repository 9. The metadata may include parameters, such as MAC address, IP, source, case #, date, location, file size, digital signatures, etc. The blocks 8 may have multiple components. Once written to the blockchain repository 9 the blocks 8 positions are recorded within the blockchain repository 9. Various other Blocks for other consumers may be written after the data lease block 8.

The intended and authorized Consumer is notified by the data lease system 4, over a suitable secure network 11, that the digital evidence 2 is available, and then the Consumer uses a client-side data lease system 14, which may comprise computer software instructions 15, stored on non-transitory memory 16, and that are executable by a processor or controller 17 on the consumer's computer 18 to read a copy 22 of the original digital evidence 2. The data lease system 4 may present the terms and conditions 3 to the Consumer, and require a digital signature or some other form of secure acknowledgement accepting the terms and conditions 3 prior to a copy 22 of the digital evidence 2, the terms and conditions 3 and the metadata is released to the Consumer's environment. The data lease system 4 and/or 14 may set up a proprietary encrypted temporary working data cache 21, on the blockchain repository 9, on the consumer's computer 18 or on a cloud-based location accessible by the Consumer, within which the copy 22 of the digital evidence 2, the terms and conditions 3, and the metadata may be decoded and saved along with various computer software utilities to monitor progress of the processing and status of the copy 22 providing audit details during the term that the copy 22 exists on the data cache 21.

The Consumer, e.g. the current transcriber, and the other suppliers of the original digital evidence 2 may all own some of the digital evidence 2 that is relevant to the event that the Producer or Producer's client is investigating. In this case the Transcriber may produce new content 20 in the form of a required digital document from the audio and/or video evidence, and may then use the data lease system 4 and/or 14 to build, e.g. encode, and write the required digital document, along with Producer's destination metadata, tracking data and the digital signature, onto one or more new related data blocks 23 back onto the blockchain repository 9 via a suitable network 11, The new related data blocks 23, may include links to the block 8, which includes the original digital evidence 2. A message may be sent by the data lease system 4 and/or 14 that advises the Producer of the completion of the job under the accepted terms and conditions 3. The data lease system 4 may then delete or otherwise remove the data cache 21, including the copy 22, used by the Consumer during the production of the new content 20 after the new related data blocks 23 are confirmed written to the blockchain repository 9.

With standard Blockchain each party requires only access privileges to the blocks or data, but in accordance with the data lease system 4, the agreement's terms and conditions 3 also form part of the data stored on the block 8. In this case the Producer prepares an "agreement" or list of terms and conditions 3, e.g. using the data lease computer software instructions 5. The terms and conditions 3 represent a list of "rules", these rules may be accepted by each party, i.e. the Producer, the Producer's Client, and the Consumer, using the digital evidence 2 within the data lease system 4, and the terms and conditions 3 along with access privileges of the consumers, form a part of the one or more Blocks 8 that are stored within the general blockchain (database) repository 9. The terms and conditions 3 may be assembled and written to the blockchain repository 9, and the data lease system 4 may then notify the third parties, e.g. Consumers, of their access to the terms and conditions 3 and a copy 22 of the original digital evidence 2. This part of the process documents the transaction within the data lease system 4 specifically designed for this purpose. The data lease system 4 is used to "build" the rules that are used to manage the terms and conditions 3 of the transaction. This eventually forms a part of the one or more blocks 8 being added to the blockchain repository 9 for purposes of preparing and sharing the rules that the data lease system 4 used between the Producer and the Consumer. Because the data should be "machine-readable" the rules may be extracted into a human-readable language which the data lease system 4 can understand and enforce. The data lease system 4 may also accept "bids" or "acceptance" of a particular job and alert via messages the Producer of this desire and the selected consumers may be provided with credentials, e.g. access privileges, to log into the blockchain repository 9 to review the terms of that access by the Consumer, e.g. transcriber, or other authorized user. This messaging and credentials process may be conducted over a suitable secure network.

The terms and conditions 3 included in the agreement may be conditions such as: access term or period of time, e.g. between two dates and two times; collection by the authorized user; purpose, e.g. to be used as evidence supporting charges; and which may be used in a court of law and presented by a Prosecutor where Producer retains ownership of the digital content. The terms and conditions 3 may also require that the Consumer is a predetermined subscriber with access privileges and authorized to use the data lease system 4 to produce new content 20, and that the Producer agrees to the "rules" and provides access to the digital evidence 2, i.e. the copy 22, that is desired. Once that access is granted the Blockchain "rules" for this transaction ensure that compliance to the terms and conditions 3 are maintained. Then the Consumer may then access the digital evidence 2, e.g. the copy 22 of the digital evidence 2, through the Data Lease system 4 and 14 in the data cache 21, and process as necessary with authenticated parties as long as the "rules" in the one or more blocks 8 are maintained. This mechanism ensures that the Producers terms are met. The digital evidence 2 that the Consumer is looking to use may be audio or video from Public CCTV/Smartphones, audio and/or video from Military base cameras, audio and/or video from the Hospital records of the suspect, and audio and/or video from similar case records collected by any evidence-based market. All these parties may not know each other but may be guaranteed that the exchange or transaction of the digital evidence 2 they are contemplating will be secure, and that the ownership of the digital evidence 2 used and produced will be protected. The legal aspect can be assured that a verifiable chain-of-custody will exist starting at the first log on to the blockchain repository 9.

The terms and conditions 3 may contain terms which define that certain inconsequential portions of the digital evidence 2 provided by the Producer are redacted by the Producer, as the inconsequential portions have nothing to do with the new content 20 being produced by the Consumer. This customization protects the release of information not desired by the original owner of the digital evidence 2.

The blockchain repository 9 maintains a clear and indisputable record of the transactions associated with this exchange and in that way represents a chain-of-custody. Typically, this is one of the strengths of Blockchain technology that the smart lease system 4 leverages, although this application of it is quite different since this transaction has no financial basis. Typically, the types of files that end up being used as evidence contain other extraneous information which is either unrelated to the current case or contains information which is confidential. The smart lease system 4 may protect that content from disclosure through the proprietary encrypted cache 21 that exists only for the period of time in the "terms and conditions" and only for the authorized and authenticated Consumer.

Once the agreement, i.e. the terms and conditions 3, of the data lease is agreed by all parties the Producer owned content, i.e. the digital evidence 2, is copied to the blockchain repository 9 and securely "packaged" by the processor 7 of the data lease system 4. In this case because each job and the associated Block 8 may contain a number of different types of evidence, applets, attachments and so on the digital evidence 2 may be packed together for encryption and a small program to ensure that the terms and conditions 3 are accepted BEFORE the content is unpacked. The copy 22 is made available on the data cache 21, e.g. the public Blockchain repository 9, according to the terms of the agreement 3. After the predetermined time period or event when the access to the data cache 21 is withdrawn the Consumer based "copy" 22 and the data cache 21 are irrevocably removed, i.e. deleted. Although the Block 8 remains in the Blockchain repository 9, the Consumer's access to the Producers file, (digital evidence 2), i.e. the copy 22, is ended according to the previously accepted "rules". Accordingly, the copy 22 of the file(s) previously saved at the local consumer data cache 21 is deleted. A key factor to this innovation is that the data cache 21 may be virtual and may be distributed. A decentralized repository of information means that many smaller repositories, e.g. data cache 21, may exist in different places and on different devices. These are secured, encrypted and exist only for the duration of the lease timeframe according to the terms and conditions 3. The data lease system 4, i.e. computer software instructions 5 and the processor 7, ties all the data caches 21 together to appear as one large repository. Each repository owner (Producer) will have numerous Consumer data caches 21 of digital evidence tracked by the data lease system 4. Each consumer data cache 21 may be bound together in a single blockchain repository 9 allowing for the exchange of evidence that exists on any local repository with any other member of that blockchain repository 9 who has agreed to the terms and conditions of the Blockchain contract. The digital evidence 2 owned by a Producer may be sent to any local data cache 21, which is a party to the blockchain repository 9.

FIG. 1 illustrates the details related to the transition of the digital evidence 2 from an online secure environment to an authorized securely managed offline environment and then back to a secure online environment. The process 1 is managed by the smart data lease system 4. During the process 1 original digital evidence 2 is acquired and securely packaged, and new content 20, e.g. a new transcription, is added to the other metadata and audit data returned via the smart data lease system 4. The Producer of the digital evidence 2, via the smart lease system 4, compiles information to support the assignment of specialized work to an offline Consumer (transcriber). The information may come from multiple sources and systems, and include the digital evidence 2, such as evidence management, transcription format specifications, notes, annotations, attachments, source system identifiers, along with the digital terms and conditions 3, digital agreements 10, and small utility applets and metadata 30. The smart data lease system 4 assembles the component data files into an encrypted package 35, generating digital signatures and other keys for the content. The smart lease system 4 encodes the package 35 as the encrypted block 8 for adding to the transcription blockchain repository 9. There may be one or more blocks 8 depending on the size of the digital evidence 2 and the related files 3, 10 and 30, and may require that additional block numbers be tracked related to block 8 in the blockchain repository 9. The destination Consumer (transcriber) using the smart data lease application 15 unpacks the terms and conditions 3 of the data lease which requires a digital acceptance 40 to proceed to the next step. The digital acceptance 40 of the terms and conditions 3 of the data lease is recorded for later use. Upon acceptance, the smart data lease application 15 begins to decode and unpack the copy 22. The copy 22 may include the small applets which prepare the encrypted cache 21 within which the copy 22 of the digital evidence 2 is placed. The consumer may then read and play the evidence as appropriate to perform the desired tasks. For the period of time and the conditions specified in the accepted terms and conditions 3 the copy 22 is available for the desired job, in this case producing a verbatim or similar transcript of the audio evidence. Once these tasks are complete or the assigned time expires the smart data lease system 4 begins to assemble the new content 20 along with metadata 45, e.g. the security statistics, timestamps, and audit trail, into an encrypted return package 50. Part of this processing requires the generation of digital keys of the content as assembled. The return package 50 may be encrypted then written back onto the transcription blockchain repository 9. The smart data lease system 4 may then delete the local encrypted cache 21 and any content, e.g. copy 22. The newly generated block(s) 23 contain information which relates the block(s) 23 to the original source block(s) 8. At the time that the new block(s) 23 are written to the blockchain repository 9 a message may be sent by the smart data lease system 4 to the original owner, e.g. producer and client, to advise that a return block 23 has been written to the blockchain repository 9 related to certain block numbers, e.g. block 8. At the source (Producer) the new Block(s) 23 may be evaluated by the smart data lease system 4 to extract the content and verify the security and audit trails for compliance by the transcriber with the original terms and conditions 3 as well as confirming the integrity or veracity of the returned content.

Figure 2:
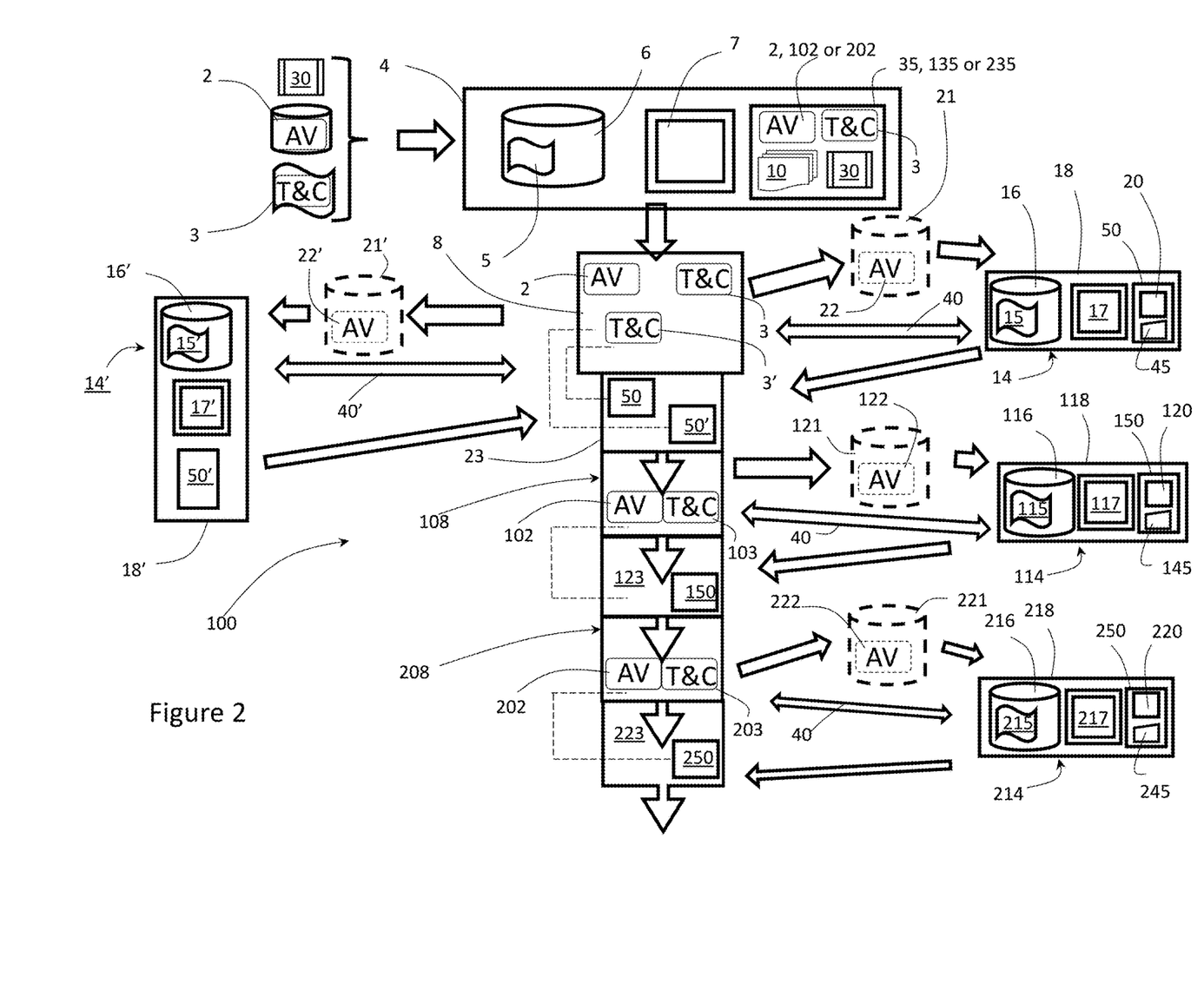
FIG. 2 is a schematic detail diagram in accordance with an example embodiment of the present disclosure.

FIG. 2 depicts the use of the smart data lease system 4 including the transition between online secured digital evidence 2, and secured and managed data leased digital evidence, e.g. copy 22, offline with multiple destinations and Consumers (Transcribers). In this example system 100, a long blockchain repository 9 containing individual Producer or source blocks 8, 108 and 208 of encrypted packages 35, 135 and 235, respectively, comprising digital evidence 2, 102 and 202, along with the metadata 30, and the terms and conditions 3 corresponding thereto for the smart data lease system 4. The chain of blocks encoded by the Producer may extends to many thousands of blocks in either direction. Some blocks may be directly linked to each other as they contain data and digital evidence 2 which is combined as a block group authorized to an offline Consumer, in this case a transcriber. As the blocks cross from the online and controlled environment to the offline environment typical of a Transcriber Consumer, the smart data lease system 4 or 14 used by the Transcriber accesses and authenticates against the Block content through a series of digital acceptance 40, e.g. signatures, credentials and/or keys. Once authorized, the Transcriber is presented with the terms and conditions 3 of the smart data lease system 4, which may be the same or different for each consumer. A valid response, e.g. digital acceptance 40, to these conditions is requested and the answer is recorded. The blocks, e.g. blocks 8, 108 and 208, decoded by the smart data lease system 4 contain all the content required by the Transcriber, e.g. including copies 22, 22', 122, and 222 of the digital evidence 2, 102 and 202, such as AV, metadata, terms, notes, annotations, attachments and specific source specifications. The smart data lease system 4, once the terms and conditions 3 have been accepted, e.g. via the digital acceptance 40, then creates a proprietary encrypted cache 21, 121 or 221, e.g. on the local machine 18, 118 or 218 or a cloud memory connected thereto, within which the necessary evidence content, e.g. copies 22, 22', 122 and 222 are unloaded. In this depiction four separate Transcriber environments are depicted, each including the client-side data lease system 14, 14', 114 and 214, which may comprise computer software instructions 15, 15', 115 and 215 stored on non-transitory memory 16, 16', 116 and 216 that are executable by the processor or controller 17, 17', 117 and 217 on the consumer's computer 18, 18', 118 and 218. Each Transcriber may have accepted terms and conditions 3 which vary by the length of the data lease time, the turnaround time, the level of redaction, the formats etc. Once the time expires or the Transcriber completes their work the smart data lease system 4 may then begin to encode a new destination block 23, 123 or 223, respectively, with similar content as was in the original Producer Block 8, 108 and 208. The new destination blocks 23, 123 and 223 though contain additional metadata related to specific identifying numbers of the computer, the transcriber id, credentials, audit trail of events which occurred during the transcription and other security content to assure the veracity of the original content delivered. The new destination blocks 23, 123 and 223 may also contain the new content 50, 150 and 250 including metadata 45, 145 and 245 produced by the Transcriber on behalf of the evidence Producer.

FIG. 2 illustrates the distributed and decentralized nature of the secure Blockchain Exchange. The apparatus may accommodate any exchange of protected data between secure online environments and an offline environment, such as a computer not permanently connected to the Internet, but which is secured through the proposed techniques to maintain the data integrity and confidentially throughout its use by the Consumers. The blockchain repository 9 connects many Consumer based distributed and secured local repositories that retain information and metadata describing the digital evidence 2, 102 or 202, its location, and the associated rules of use, i.e. terms and conditions 3. Equally there could be multiple producers who are authorized to write data to the public Blockchain repository 9 for use by authorized consumers.

With further reference to FIG. 2, the system 100 may enable a plurality of Consumers in different markets, such as Insurance, Justice and Government, to be given permission/access via their computers 18 and 18' to separate individual caches 21 and 21', respectively, each including copies 22 and 22', respectively, of the digital evidence 2 to produce new content 20 and 20', e.g. transcripts, which are then written back to the block 23 of the blockchain repository 9 with all of the status or audit information collected by the data lease system 4, 14 and 14', while that content was in use according to the terms and conditions 3 and 3', which may be the same or different terms and conditions. The status and audit metadata may be critical to supporting that the security of the digital evidence 2 has been maintained, and may include data such as time, user, system events (read, play, write, print) MAC addresses, IP addresses, ESN numbers, reads, writes, other programs used to access content. The system 100 may also enable a plurality of predetermined Consumers via their computers 118 and 218 with permission/access to separate individual caches 121 and 221, each including a copy of different files of digital evidence 122 and 222, which may contain different terms and conditions 103 and 203, to produce different new content files 120 and 220 for transmission to different blocks 123 and 223 of the blockchain repository 9. In this case, the different terms and conditions 103 and 203 could include a difference in the turnaround times or expiry dates.

The exchange or transaction of the digital evidence 2 is protected and documented by the data lease system 4 and the blockchain repository 9, which is managed by the terms and conditions 3 referenced by the specific block 8 within the blockchain repository 9. The data lease system 4 provides a mechanism for the Producers and the Consumers to securely connect, exchange content, e.g. digital evidence 2, based on a set of rules, e.g. terms and conditions 3, identifies the content, provides a messaging infrastructure, provides an authenticated copy 22 for limited use according to the rules agreed in a secure environment and, documents this in a secure Blockchain-based chain-of-custody design. At the expiry of that period the Producer's content, i.e. the copy 22, 22', 122 and 222, is removed from the Consumer's data lease environment, e.g. data cache 21, 21', 121 and 221.

Figure 3:
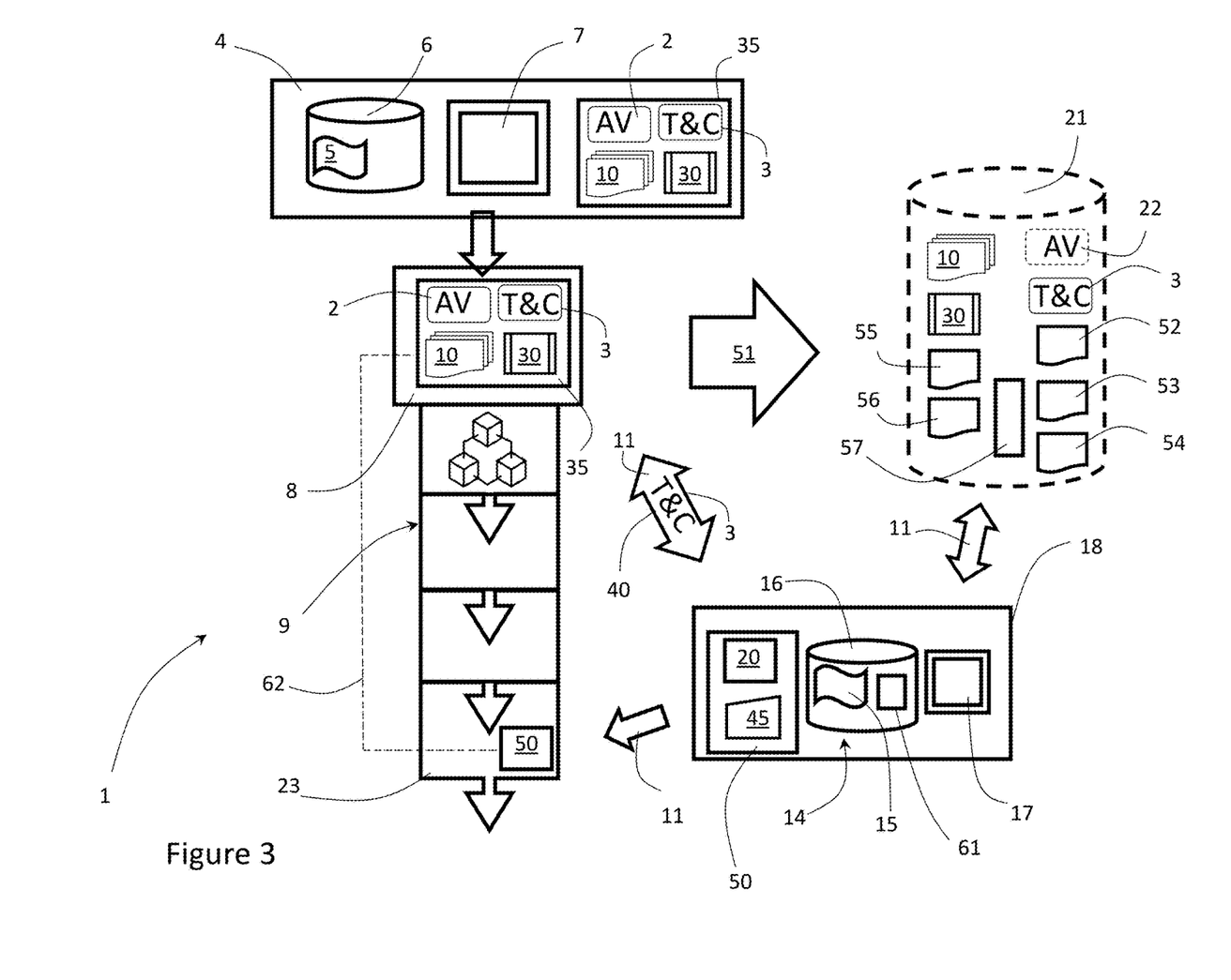
FIG. 3 is a schematic diagram of the consumer side of the embodiment of FIG. 1.

With reference to FIG. 3, the Consumer, e.g. Transcriber, side of the smart data lease system 4, may comprise an environment encompassing the entire offline environment. The Producer may have moved the digital evidence 2 to the blockchain repository 9 and the specific set of blocks 8, as the encrypted package 35. The blocks 8 contain the encoded package 35 with all of the required data for the authorized Transcriber to perform their work. The package 35 is then partially decoded by the smart data lease system 4 used by the Transcriber to unpack the package 35. The smart data lease system 4 and/or 14 reads the block 8, decodes and presents the terms and conditions 3 before decoding the digital evidence 2 or creating the encrypted local cache 21. The Transcriber accepts the terms and conditions 3 using the digital acceptance 40, e.g. unique key to them, such as username and password entry, which once matched by the smart data lease system 4 then begins to decode and unpack the digital evidence 2 contained in the blocks 8 authorized to that specific Transcriber. A set of keys may be used initially to confirm the recipient is who is intended for the content. As the keys are authenticated the smart data lease system 4 and/or 14 begins to decode and unpack, at 51, the package 35 into a proprietary and encrypted cache 21, i.e. a working area. The decoding and unpacking of the package 35 may comprise content including the terms and conditions 3, the copy 22 of the digital evidence 2, the request 10, the metadata 30, an audit trail monitoring program 52, an identifier collection 53, attachments 54, annotations 55, notes 56 and time stamps 57. A specialized and proprietary player 61 may be available in the smart data lease system 14, e.g. stored in the non-transitory memory 16 and executable by the processor or controller 17, as some or all of the content may require a special encryption/decryption technology to read and play. The Transcriber may uses their computer 18, or some other smart device, with the smart data lease system 14 and application 15 to access and work with the digital evidence 2 in the protected and tracked environment of the local cache 21. As the work is completed or the lease data time expires and access prevented by the smart data lease system 4 and/or 14, the smart data lease system 4 and/or 14 then begins to pack and encode the new content 20 produced as a result of their transcription into the encrypted return package 50 for storage on the new return block 23. The encrypted return package 50 may include the new content 20, e.g. a transcription of the copy 22 of the digital evidence 2, the metadata 45, e.g. the security statistics, timestamps, and audit trail of the new content 20, along with some or all of the original content, e.g. one or more of the terms and conditions 3, request 10, copy 22, metadata 30, the audit trail monitoring program 52, the identifier collection 53, the attachments 54, the annotations 55, the notes 56 and the time stamps 57. The new return block 23 when complete is written to the blockchain repository 9 by the smart data lease system 4 and/or 14 and a unique link 62 is assigned that links it with the original block 8 assigned to the Transcriber. As the new return block 23 is written to the blockchain repository 9 the proprietary and encrypted cache 21 is removed along with all of the content from the Consumers/Transcribers computer 18.

As depicted the client side of the data lease system 14 may perform several additional functions, such as one or more of the following: 1) working in an offline mode; 2) interpreting and applying the terms and conditions 3 of the data lease, e.g. date, time, length, permissions, system events occurring during the use, actions taken by the user and other local events recorded by the operating system; 3) providing the proprietary reader/player 61 configured to encrypt/decrypt the copy 22 of the digital evidence 2 for the purpose defined in the terms and conditions 3; 4) tracking all events and actions associated with the copy 22 of the digital evidence 2, such as file use, encryption, de-encryption, acceptance (or not) of terms and conditions 3 set forth; 5) reading and auditing unique factors such as MAC address, IP address, User Credentials, program use and so on; and 6) taking the new content 20 produced (the transcript), and package that back into the new return block (s) 23 for writing to the Blockchain repository 9.

Figure 4:
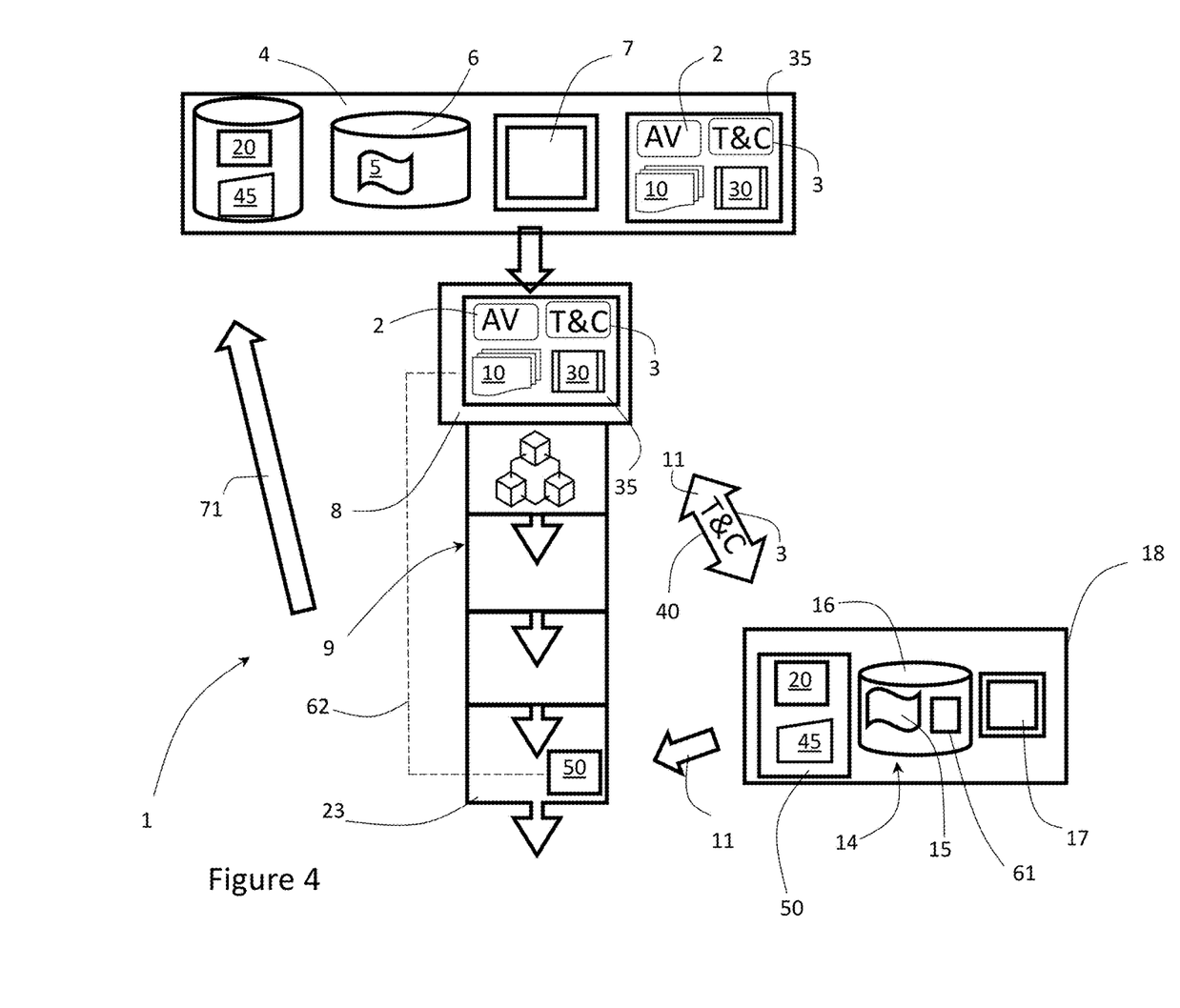
FIG. 4 is a schematic diagram of the producer side of the embodiment of FIG. 1.

With reference to FIG. 4, on the producer side of the data lease system 4, the functions are focused on the encoding and decoding of the blocks 8 and unpacking of the new digital evidence 2. As well it must capture the various metadata, audit trail, and terms and conditions 3 of the digital evidence 2 to ensure that security and compliance have been maintained. The origins of the digital evidence 2 packaged into the block 8 may come from numerous locations and files including, customer contracts, case files, required tools or utilities and authorizations required.

The processing, decoding and unpacking of the new content 20 along with all of the audit and tracking or metadata 45, which validates the veracity of the new content 20 and confirms the security of the data leased to this Transcriber is evaluated. After the Consumer, e.g. transcriber, via the data lease system 14, returns the new content 20 and saves the return package 50 into the Blockchain repository 9 with the required tracking and security metadata 45 within the prescribed time as dictated by the terms and conditions 3, the smart data lease system 4 sends the Producer a communication in the form of a notification 71. The notification 71 comprises the original Block number, e.g. block 8, and the new linked block number, e.g. block 23, on the blockchain repository 9. The Producer's smart data lease system 4 reads the relevant blocks 23 off of the blockchain repository 9 and begins to decrypt, decode and unpack the new content 20 along with security and audit metadata 45. As this process proceeds the audit metadata 45, e.g. metadata, timestamps, audit trail and security identifiers are analyzed. This analyses confirms the veracity of the new content 20, but also confirms that the terms and conditions 3 of the smart data lease were complied with. Should the smart data lease have expired before the Transcriber completed the job then this status would be noted and assessments made to determine circumstances require a new smart data lease. The audit metadata 45, whether completed or expired, contains items, such as events occurring on the destination/Consumers computer 18. The validation provides evidence that the confidentiality and security of the original digital evidence 2 was maintained throughout the data lease term. As that confirmation is completed the new content 20 and metadata 45 supporting the veracity of the new content 20 is stored back to the original smart lease system 4, e.g. on the content Producer's non-transitory memory 6 or other suitable memory. The new content 20 is then used by other systems, e.g. to support AI systems analyses, payment terms, and file appropriately the resulting transcripts.

Figure 5:
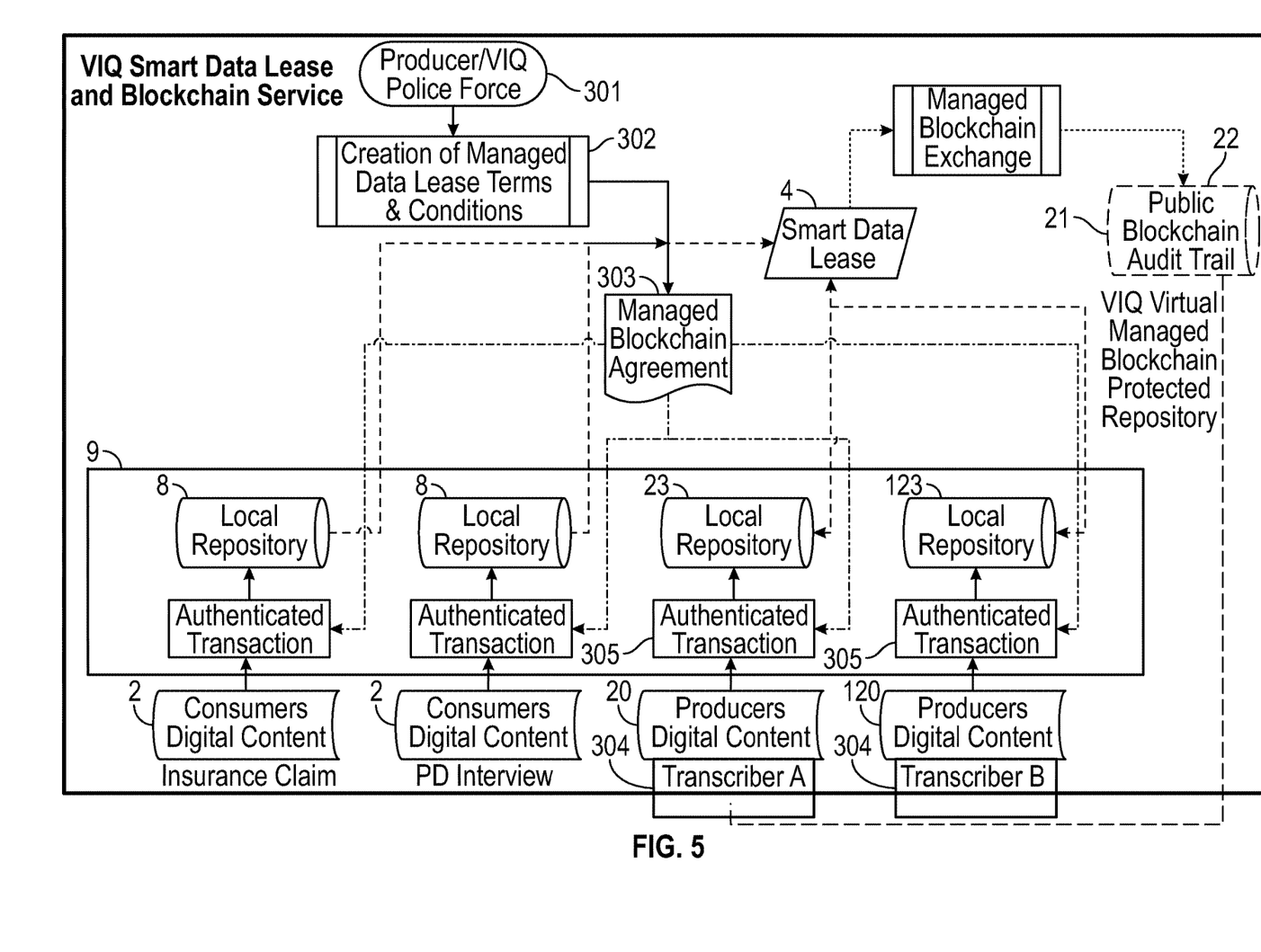
FIG. 5 is a flow diagram in accordance with some of the example embodiments of the present disclosure.

With reference to FIG. 5, the Producer 301, using the smart data lease system 4, may prepare at box 302 an agreement 303, including the terms and conditions 3, inside the blockchain repository 9 with one or more protected portals, and may then send notices to each predetermined secure Consumer 304 via any suitable communications network, e.g. email, telephone etc. Each Consumer 304 may then enter one of the protected portals to the blockchain repository 9 and accepts the Terms and Conditions 3 or adjust as acceptable. As each Consumer 304 accepts the agreement 303, the smart lease system 4 then creates the new return blocks, e.g. 23, 123 and/or 223, in the blockchain repository 9 and the secure temporary data cache 21. Once that path is created at the blockchain repository 9 the transaction is recorded and authenticated at 305 in the blockchain repository 9 and saved in the data cache 21 accessible by the Consumer 304. The path or link to the data cache 21 is broken or deleted when the terms and conditions 3 of the agreement 303 have expired. The original digital evidence 2 remains in the block 8 of the blockchain repository 9 as an original. In this way the Producer 301 and the Consumer 304 share a secure and well managed method, e.g. by the data lease system 4 and 14 executing the terms and conditions 3, to exchange the digital evidence 2, i.e. copies 22, with each other that protects the interests of all parties and secures the digital evidence 2 with the veracity of a Blockchain environment. This is not simply a separate agreement with a blockchain backend, but rather a customized extension of a typical Blockchain with a "parameters-based" agreement, which is embedded in and manages the Blockchain transaction parameters. The result is an authenticated chain-of-evidence list of certified transactions as well as a secured and protected virtual repository of digital evidence 2. Rather than create a massive database of replicated content, the actual content, e.g. digital evidence 2, is left in distributed and decentralized databases or local repositories, e.g. block 8, until called upon. In this manner the block 8 generated and its subpart the "transaction" contains not only the actual exchange information, but also all the parameters or rules, e.g. terms and conditions 3, associated with that exchange. Unlike a financial blockchain transaction this block transaction may contain many Producers files, some of which could be different content and formats, e.g. images, video's, audio, text, documents, etc., and may include multiple different Consumers.

The data lease system 4 may be applied in numerous situations where one party is trying to assemble content to prove an event using digital evidence 2 collected by third parties. In the case of other evidence-based markets, such as medical mal-practice, the digital evidence 2 collected from numerous places where the professional is required to demonstrate competency, may be assembled as previously described and represent proof of their competency. In most scenarios the data lease system 4 may support a secure and managed exchange of content with the veracity to withstand legal scrutiny between online and offline environments. The veracity of that evidence becomes the chain-of-custody maintained and verified through the terms and conditions 3 managed by custom blocks 8 in the blockchain repository 9. This will equally apply to digital evidence 2 mined by AI through all means of private and publicly available resources. Providing a blockchain secured, "terms and conditions" modified transaction list in a distributed manner allows for both Producer and Consumer to be unknown to each other but interact in a trusted exchange.

The smart data lease system 4 may in the same manner protect exchanges of protected data between Producers and larger entities such as Transcription companies who in term provided that proprietary content to numbers Consumers (Transcribers) to complete offline jobs.

The term controller or processor may include a computer processor including computer hardware and computer software executable thereon along with suitable memory for storing the computer software. The term circuit may include dedicated hardware or hardware in associated with software executable thereon.

As used in this application, the term "circuitry" may refer to one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. A method comprising:
  receiving, at a computer system, digital evidence;
  transmitting, to a consumer from the computer system, terms and conditions for accessing the digital evidence, the terms and conditions identifying a predetermined amount of time available to the consumer for accessing the digital evidence;
  receiving, at the computer system from the consumer, an acceptance of the terms and conditions;
  encoding the digital evidence and the terms and conditions into a first block of a blockchain database, wherein the encoding of the digital evidence and the terms and conditions into the first block comprises:

packaging multiple types of content together, resulting in packed content;

compressing the packed content, resulting in compressed packed content;

encrypting the compressed packed content, resulting in encrypted content; and uploading the encrypted content into the first block;

transmitting, from the computer system to a consumer computer associated with the consumer, notification of access to the digital evidence and the terms and conditions within the first block, wherein:

the consumer computer generates a temporary data cache on the consumer computer, the temporary data cache containing contents of the first block;

the temporary data cache is deleted upon expiration of the predetermined amount of time; and the consumer computer records interactions between the consumer and the temporary data cache, resulting in an audit trail;

receiving, at the computer system from the consumer computer, the audit trail; and encoding the audit trail into a second block of the blockchain database, the second block referencing the first block.

2. The method according to claim 1, wherein: the consumer computer uploads additional digital evidence generated by the consumer to a third block of the blockchain database, the additional digital evidence relating to the digital evidence, the third block linked to the first block.

3. The method according to claim 2, wherein the digital evidence comprises at least one of a digital audio and/or a video recording; and wherein the additional digital evidence comprises a transcription of the at least one of the digital audio and/or audio of the video recording.

4. The method according to claim 2, further comprising: sending a communication to a producer of the digital evidence after the additional digital evidence has been uploaded.

5. The method according to claim 1, wherein the terms and conditions comprise restrictions associated with offline use of the digital evidence, the restrictions comprising: who can access the digital evidence, what the digital evidence is used for, and how long the digital evidence is available.

6. The method according to claim 1, wherein the acceptance comprises: a digital signature at least one timestamp; and a credential.

7. The method according to claim 1,
wherein the multiple types of content comprise: metadata, audio and video voice files, attachments, notes, security identifiers, and the terms and conditions.

8. A system comprising:
a first processor; and
a non-transitory memory storing instructions that, when executed by the processor, cause the processor to perform operations comprising:
receiving digital evidence;
transmitting, to a consumer, terms and conditions for accessing the digital evidence, the terms and conditions identifying a predetermined amount of time available to the consumer for accessing the digital evidence;

receiving, from the consumer, an acceptance of the terms and conditions;

encoding the digital evidence and the terms and conditions into a first block of a blockchain database, wherein the encoding of the digital evidence and the terms and conditions into the first block comprises:

packaging multiple types of content together, resulting in packed content;

compressing the packed content, resulting in compressed packed content;

encrypting the compressed packed content, resulting in encrypted content; and uploading the encrypted content into the first block;

transmitting, from the computer system to a consumer computer associated with the consumer, notification of access to the digital evidence and the terms and conditions within the first block, wherein:

the consumer computer generates a temporary data cache on the consumer computer, the temporary data cache containing contents of the first block;

the temporary data cache is deleted upon expiration of the predetermined amount of time; and the consumer computer records interactions between the consumer and the temporary data cache, resulting in an audit trail;

receiving, from the consumer computer, the audit trail; and encoding the audit trail into a second block of the blockchain database, the second block referencing the first block.

9. The system according to claim 8, wherein: the consumer computer uploads additional digital evidence generated by the consumer to a third block of the blockchain database, the additional digital evidence relating to the digital evidence, the third block linked to the first block.

10. The system according to claim 9, wherein the digital evidence comprises at least one of a digital audio and/or a video recording; and wherein the additional digital evidence comprises a transcription of the at least one of the digital audio and/or audio of the video recording.

11. The system according to claim 9, wherein the non-transitory memory stores additional instructions that, when executed by the processor, cause the processor to perform operations comprising: sending a communication to a producer of the digital evidence after the additional digital evidence has been uploaded.

12. The system according to claim 8, wherein the terms and conditions comprise restrictions associated with offline use of the digital evidence, the restrictions comprising: who can access the digital evidence, what the digital evidence is used for, and how long the digital evidence is available.

13. The system according to claim 8, wherein the acceptance comprises: a digital signature at least one timestamp; and a credential.

14. The system according to claim 8,
wherein the multiple types of content comprise: metadata, audio and video voice files, attachments, notes, security identifiers, and the terms and conditions.

* * * * *